165-119
FIP: 04/96 OR SR RE01879
WILLIAM A. LIGHTHALL
IMPROVEMENT IN POTABLE-WATER CONDENSERS.
No. 1879
Reissued Feb. 21, 1865
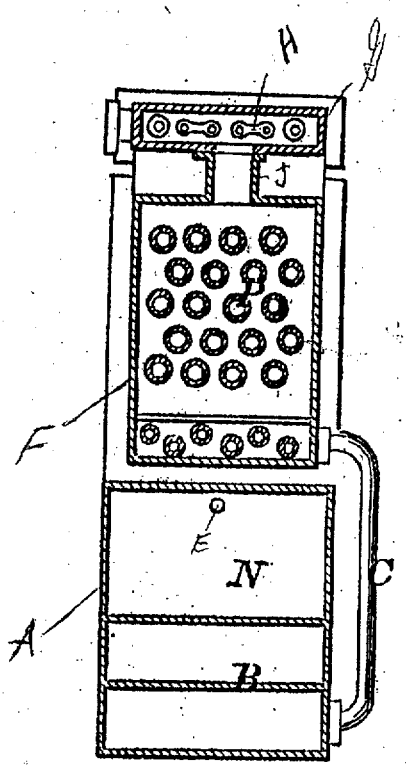

UNITED STATES PATENT OFFICE.

WILLIAM A. LIGHTHALL, OF NEW YORK, N. Y.

IMPROVEMENT IN POTABLE-WATER CONDENSERS.

Specification forming part of Letters Patent No. 36,010, dated July 29, 1862; Reissue No. 1,879, dated February 21, 1865.

*To all whom it may concern:*

Be it known that I, WILLIAM A. LIGHTHALL, of the city, county, and State of New York, have invented certain new and useful Improvements in Potable-Water Condensers; and I do hereby declare that the following is a full and exact description of the same, reference being had to the accompanying drawings and to the letters of reference marked thereon, in which—

Figure 1 is a vertical central longitudinal section; Fig. 2, a cross-section taken through the line *x x*, Fig. 1; and Fig. 3 a plan view of the heater, detached, with its cover removed.

The objects and purposes of my invention are, first, to so arrange and combine the condenser for making potable water, (from salt or other impotable water,) the heater for heating the supply of feed-water to the boiler, the filter for extracting from the condensed water its empyreumatic qualities, and the tank for holding and containing the condensed water as made to be run off or pumped off to other receivers or reservoirs, as may be required, in the smallest possible space and in the nearest connection with each other; and, second, to so arrange the cooling-tubes in the said condenser in relation to the top of the condenser-case and to the bottom thereof that there shall be left above and below said tubes and the said bottom and top of said case a sufficient space for the ready passage of steam to be conducted that may enter into the said condenser, and which will require to be passed beyond the first division-plate of the apparatus, (shown in the accompanying drawings,) as set forth hereinafter.

A is the base of the apparatus, in the lower part of which is placed the filter B, which is filled with charcoal in each of the two portions into which A is divided, the purpose of the same being to abstract from the condensed water run into it the empyreumatic qualities peculiar to condensed or distilled water. The condensed water is run into the filter at one end of its bottom section through the pipe C, and, after traversing and passing through the charcoal contained in that section, is passed into and through the upper section, (and the charcoal contained therein,) and from thence into the tank N, from which it is taken off (either by gravity or by the suction of a pump, as may be required, in the locality in which the apparatus may be placed) through the nozzle E.

F is the condenser of the general form and arrangement described in the Letters Patent of the United States granted to me under date of April 22, 1862, but which differs from that shown in said Letters Patent in the matter of having sufficient spaces, as shown in the drawings, left above and below the tubes and between the top plate and bottom plate for the ready passage of steam from one space to the adjoining one, (as made by the division-plates R,) the said spaces being marked S S′. This condenser is placed on top of and is secured to the base A, as shown, the condensed or distilled water being taken off and away from it and carried into the filter B through the pipe C, as before described.

G is the heater placed upon and attached to the top of the condenser, which is filled in its interior with the series of pipes H, through which the feed-water is passed from the feed-pump to the boiler, and into which steam is exhausted from the feeding, cooling, and supply pumps (or is supplied from the boiler direct by a separate nozzle) through the nozzles *a a′ a²*, for the pupose of heating the feed-water before it enters the boiler, in order that a saving of fuel may be effected thereby over what would be required to be used were the feed-water to be fed to the boiler cold. The feed-water is supplied to the heating-pipes H through the connection *b*, and is taken off to the boiler through the connection *c*, or vice versa, as may be desired. The drop of water produced in the interior of the case of the heater (by the condensation of the steam in coming in contact with the surfaces of the case and the surfaces of the heating-tubes) is taken off into the condenser F through the connecting-pipe J, as is also the uncondensed steam from the heater, which passes into the condenser and is condensed therein by the cooling-water passing through the tubes K, as is set forth in the Letters Patent before named. The incondensable vapor from the condenser is passed off from the condenser by the nozzle *d*. By this arrangement the whole of the parts of the apparatus are combined in a space no greater than that required to be occupied by the condenser alone, except in its height, which can always be obtained, and the action of the whole and the supervision and control of the same on the part of the attendant engineer can be more readily watched and cared for than if the same parts were separated and located distinct and apart from each other. Further, by the construction of the case of the condenser F in its relation to the tubes K so as to form the spaces S S′, as shown, the ready passage of the steam to be condensed from one division of the apparatus to the adjoining one adds greatly to the practical value of the apparatus and largely increases its useful effect.

What I claim as my improvement, and desire to secure by Letters Patent, is—

1. The combination of the tank N, filter B, condenser F, and heater G, when arranged in relation to each other in the manner and for the purposes herein set forth.

2. The construction of the case of the condenser F, with spaces above and below the series of tubes K, as and for the purposes set forth.

WM. A. LIGHTHALL.

Witnesses:
E. R. VAN BUREN,
C. H. CHESEBRO.